Sept. 30, 1969 B. L. McGLAMERY 3,470,319

FLYING SPOT SCANNER EMPLOYING FIBER OPTICS

Filed June 7, 1966

INVENTOR.

Benjamin L. McGlamery

BY

Watson, Cole, Grindle & Watson

ATTORNEYS.

3,470,319

FLYING SPOT SCANNER EMPLOYING FIBER OPTICS

Benjamin L. McGlamery, San Diego, Calif., assignor to Stromberg-Carlson Corporation, Rochester, N.Y., a corporation of Delaware Filed June 7, 1966, Ser. No. 555,845
Int. Cl. H04n 3/16
U.S. Cl. 178—7.1 3 Claims

ABSTRACT OF THE DISCLOSURE

A flying spot scanner utilizes an electronic cathode ray tube with optical fibers placed generally longitudinally with the axis of the beam to be lighted by the moving spot and intercepting at the opposite end an image which reflects light to a variable extent. The reflected light in the bundle of fibers is then measured to obtain a video signal by sensing the light escaping from the fibers.

This invention relates to flying spot scanners, and more particularly, it relates to flying spot scanners employing cathode ray tubes with a fiber optic faceplate.

Flying spot scanners have been used extensively in processing film transparencies for use in television presentations, for example. In such systems a spot of light is generally obtained by deflecting a cathode ray beam. This beam scans over a path laid out on a visual pattern carried on the film transparency, so that a photocell can receive the light instantaneously produced at each elemental pattern position and convert the pattern information into an electrical video signal reproducible in a television system providing a converse integration of the pattern area from the instantaneous video signals.

It is desirable in this sort of scanner to produce very highly focused cathode ray beams to get good definition reproduction from the scanned picture or pattern. Even then reflections and dispersions from the surface of the cathode ray tube, the intervening air film or space and the surface of the film transparency can cause a considerable loss of definition. Accordingly, the present invention employs a fiber optic faceplate in the cathode ray tube to produce better definition signals, since the light is confined generally to desired longitudinal communication paths by the fibers and the reflection and dispersion paths therefore do not as materially affect picture definition.

Perhaps the greatest drawback of conventional flying spot scanner techniques is the necessity to provide transparencies through which the beam can pass to a photocell video detection device which views the entire picture area, generally through an expensive lens array. This further leads to the requirement of a wide angle photodetector which may introduce signals over different light sensitive surfaces which are not easily kept absolutely uniform in response or sensitivity.

It is therefore an object of the present invention to provide an improved flying spot scanner system which can process opaque visual patterns and is not limited to transparencies.

Another object of the invention is to provide a photo sensitive video detector that maintains similar characteristics over widely dispersed areas of scan position.

A further object of the invention is to provide instantaneous video signals having high resolution.

A still further objective of the invention is to provide improved methods of developing video signals from a pattern bearing member.

These and further objects of the invention are realized in a flying spot scanner system employing a cathode ray tube with a fiber optic faceplate, wherein the photodetector device generating the video signals is positioned for response to stray light escaping from between the ends of the fibers of the faceplate.

Figure 1:
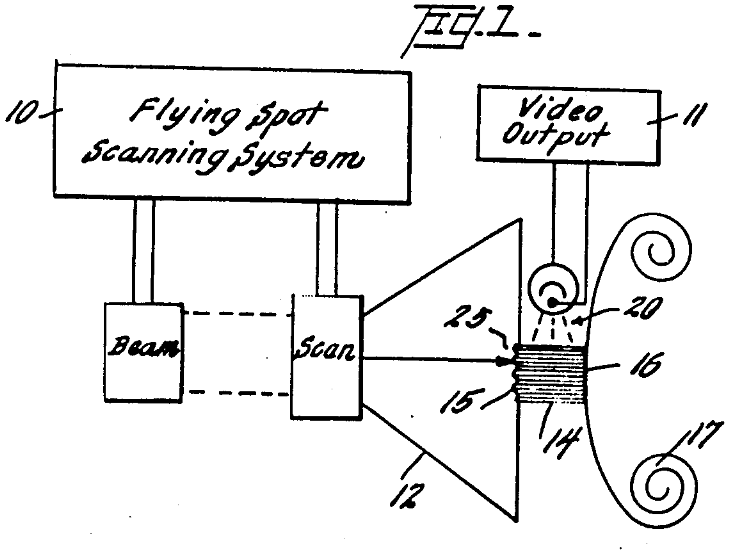
Figure 2:
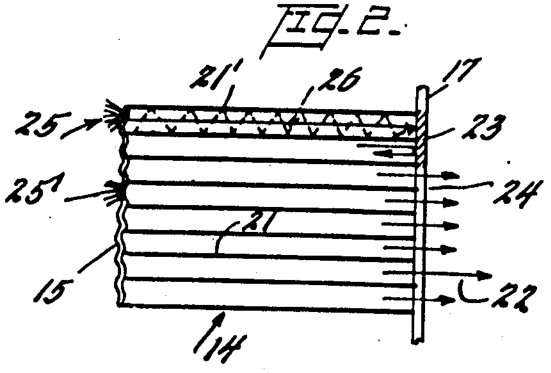
Figure 3:
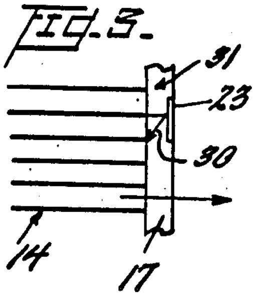

An embodiment of the invention is described in detail in the following specification with reference to the accompanying drawings, wherein:

FIGURE 1 is a block schematic diagram of a flying spot scanner system employing the invention, and FIGURES 2 and 3 are enlarged views of a portion of the fiber optic system as employed by the invention, illustrating some principles of operation.

In FIGURE 1, the flying spot scanner system 10 is shown in block diagram form since the details may be entirely conventional, except in the manner in which the video signals are reproduced for the video output portion 11. Thus, in accordance with this invention, the cathode ray tube 12 is provided with a faceplate section 14 which comprises a longitudinal bundle of light conductive fibers. The fiber optic faceplace 14 has the inner surface of the tube with which the ends of the fibers communicate coated with a phosphor 15 to reproduce from a scanning spot or electron beam a light which will be transmitted longitudinally through the fibers 14 to the surface 16 at the outer ends of the fibers.

A visual pattern such as found upon a picture, a transparency or some similar document 17 may be placed at the outer faceplate surface 16 for high resolution scanning by the flying light spot generated in cathode ray tube 12.

In accordance with this invention a light sensitive detector such as photocell 19 is placed at the side of the fiber optic bundle 14 for response to stray light 20 escaping from between the ends of the fibers 14.

In order to understand the principles of operation of this invention the enlarged segment view (not to scale) of the fibers 14 as shown in FIGURE 2 may be consulted. It may be assumed that in each fiber 21, etc. light passes longitudinally from the phosphor surface 15 through the fiber to impinge upon or pass through the visual pattern bearing member 17 as indicated by light lines 22, etc.

The pattern bearing member 17 will have contrasting surfaces rendering the visual intelligence carried thereon such as the reflective area 23 and the transmissive or absorptive area 24. This is true either of a transparency or an opaque picture such as a photo print. Assume therefore that a flying spot 25 generates light at the topmost shown fiber 21', which faces reflective portion 23. Then, as shown by the dotted lines 26 a part of the light is diffused and reflected back through the fiber at such an angle of travel that the rays 20 escape through the sides as stray light. This stray light at the sides of the fibers, in accordance with this invention, is directed by suitable means into a photocell 19 or other light detector to generate the instantaneous video signal.

Conversely, light spot 25' serves to generate in fiber 21 a beam which upon encountering contrasting surface 24 is either transmitted or absorbed so that little stray energy is produced through the sides of the fibers. Thus, the video signal may be developed having instantaneous electrical magnitude representative of the visual state of the pattern bearing member 17 at the point being interrogated by the flying spot 25. In this way it is not necessary to have light pass through a transparency to excite the photocell.

As illustrated in FIGURE 3, various positioning of the reflective spot 23 may occur relative to the ends of the fibers which will diffuse light at directions 30 such that light is lost through the sides of the fibers. The intervening gap 31 may be an air film, a surface on the pattern bearing member 17, or a specially prepared optic surface used to enhance signals produced by the method proposed by this invention.

It is therefore to be understood that certain variations may be made without departing from the spirit and scope of the invention, which is exemplified in particularity in the appended claims.

What is claimed is:

1. A flying spot scanner system for producing video signals representative of a visible object positioned to be scanned by an electron beam, comprising in combination, a cathode ray tube having a fiber optic faceplate with light conductive fibers generally arranged in a longitudinal bundle communicating from one end at a plane within the tube to the other end at a plane exterior to the tube, means generating light responsive to impact of the cathode ray beam placed adjacent said plane within the tube to produce at the inner ends of the fibers incident light carried in a generally longitudinal path through said faceplate, means presenting a visual pattern adjacent said plane exterior to the tube to receive light transmitted through said fibers, said visual pattern exhibiting portions of contrasting reflectivity whereby a magnitude of light is diffusely reflected back into the fibers representative of the reflectivity of the portion of the visual pattern being scanned by the cathode ray beam, and a video detector comprising a photo sensitive device positioned for response to light escaping from said fibers intermediate the two ends thereby reproducing an instantaneous video signal from the visual pattern.

2. A flying spot scanner comprising in combination, a cathode ray tube with a faceplate comprising a bundle of optic fibers having a phosphor at the inner end of the fibers, visual pattern means positioned adjacent the other end of the fibers, means scanning the pattern by deflection of the cathode ray beam, and a video detector producing electrical signals from the pattern comprising a photo responsive device positioned for response to light conveyed to the pattern by the fibers and reflected back from the pattern into the photo device, wherein the photo device is positioned to receive stray light escaping from the sides of said fibers.

3. A flying spot scanner comprising in combination, means including a bundle of optic fibers, means directing a point of light of such size hitting only a limited number of the fibers in the bundle in a pattern to scan substantially the entire area disposed at one end of the bundle of fibers, visual pattern means positioned adjacent substantially the entire said area to affect the extent of light reflected back into the particular fibers being scanned with different parts of the visual pattern means, and photo detection means positioned to monitor the magnitude of light from the entire bundle of fibers wherein the photo detection means is positioned to receive the stray light escaping from the sides of the fibers intermediate the ends thereof.

References Cited

UNITED STATES PATENTS

| | | |
|---|---|---|
| 2,410,104 | 10/1946 | Rainey. |
| 3,125,013 | 3/1964 | Herrick et al. |
| 3,167,612 | 1/1965 | Strickholm. |

ROBERT L. GRIFFIN, Primary Examiner

ROBERT L. RICHARDSON, Assistant Examiner

U.S. Cl. X.R.

250—217